United States Patent [19]
Blum et al.

[11] Patent Number: 5,319,948
[45] Date of Patent: Jun. 14, 1994

[54] LOW TEMPERATURE GENERATION PROCESS AND EXPANSION ENGINE

[76] Inventors: Arnold Blum, Finkenweg 16, 7268 Gechingen; Manfred Schmidt, Dachenhauserweg 37, 7036 Schonaich, both of Fed. Rep. of Germany

[21] Appl. No.: 876,273

[22] Filed: Apr. 30, 1992

[30] Foreign Application Priority Data

Apr. 30, 1991 [EP] European Pat. Off. ......... 91106969.8

[51] Int. Cl.⁵ .............................................. F25B 9/00
[52] U.S. Cl. ........................................ 62/467; 62/6; 62/87
[58] Field of Search .................... 62/6, 86, 87, 88, 401, 62/467

[56] References Cited

U.S. PATENT DOCUMENTS 4,444,019  4/1984  Arkharov et al. ...................... 62/87
5,167,124  12/1992  Lucas ................................. 62/467 X

FOREIGN PATENT DOCUMENTS 2083601  3/1982  United Kingdom ........... 62/467 PR

*Primary Examiner*—Henry A. Bennett
*Assistant Examiner*—C. Kilner

[57] ABSTRACT

In a low temperature generation process, compressed gas (3) at high pressure enters from an inlet nozzle (1) and alternately expands into one of two resonator tubes (A,B) of an expansion engine. The expanding gas excites standing acoustic waves (4) in the resonator tubes (A,B). The acoustic energy of the waves (4) is converted into electrical energy by acoustic/electric power converters and is led away outside the "cold area" of the tubes. The expansion engine contains one or more resonator tubes with a common inlet nozzle (1). Each resonator tube has an acoustic/electric power converter (5) and an exhaust port (6). Together with a compressor, a heat exchanger and a heat sink, the expansion engine provides a very effective cooling system which may be used for the cooling of small electronic devices like chips or modules.

18 Claims, 2 Drawing Sheets

LOW TEMPERATURE GENERATION PROCESS AND EXPANSION ENGINE

FIELD OF THE INVENTION

The invention relates to a process for generating low temperatures and to an expansion engine for carrying out an adiabatic-isothermic refrigeration process. When implemented in micro-mechanical form, the expansion engine and associated cooling systems may be used for the cooling of small electronic devices such as IR detectors.

BACKGROUND OF THE INVENTION

A mini-refrigeration system consisting of heat exchanger, expansion nozzle and condensation chamber is shown in FIG. 28 of "Silicon as a Mechanical Material", K.E. Petersen, Proceedings of the IEEE, Vol.70, No.5, May 1982, page 435–436. This cooling system is micro-mechanically made of silicon and works like a Joule-Thomson Cooler with single-acting throttling, as described in "Kryotechnik", W. G. Fastowski et al., page 106, Abb. 34. The cooling system allows the liquefication of nitrogen at a pressure of more than 100 bar.

Because Joule-Thomson Coolers work effectively only at temperatures below 200K and/or at high pressure (higher than 75 bar), commercial low-temperature machines use the adiabatic-isothermic expansion cycle discussed in "Kryotechnik", W.G.Fastowski et al., chapter 3.9.1., page 175. While expanding, a compressed gas executes external work without heat energy being supplied or carried off. This external work has to be dissipated, e.g., in form of mechanical or electrical energy, to regions outside of the "cold zone" of the device.

Normally, the expanding working gas drives an expansion turbine, as shown for helium in "Kryotechnik", W.G. Fastowski et al., chapter 3.8., page 173. Expansion machines consisting of pistons, clack valves, paddle wheels and the like tend to be relatively expensive or may not be implemented in a miniature refrigeration system.

In "Temperature Separation Produced By A Hartmann-Sprenger Tube Coupling A Secondary Resonator", International Journal of Heat Mass Transfer, Vol. 24, No. 12, pp. 1951–1958, the use of a resonance tube (the Hartmann Sprenger tube) for temperature separation is described. A gas column driven by jet flow is excited to a finite amplitude oscillation by accompanying travelling shock waves. Compressed gas issuing from a nozzle and entering into the Hartmann Sprenger tube is separated into cold gas exhausted from the open end of the tube and hot gas discharged through a tiny orifice bored at the end wall of the tube. By coupling a secondary resonator to the resonance tube, the thermal effect can be improved.

SUMMARY OF THE INVENTION

It is an object of the present invention to provide a simple, reliable and efficient low temperature generation process and a miniature refrigeration system using the adiabatic-isothermic expansion cycle.

Another object of the invention is to provide an expansion engine with no moving parts.

These objects are achieved by a low temperature generation process in which compressed gas enters at high pressure from an inlet nozzle and alternately expands into one of two resonator tubes of an expansion engine. The expanding gas excites standing acoustic waves in the resonator tubes. The acoustic energy of the waves is converted into electrical energy by acoustic/electric power converters and is led away from the "cold area" of the device.

The present expansion engine contains one or more resonator tubes with a common inlet nozzle. Each resonator tube has an acoustic/electric power converter and an exhaust port. When coupled with a compressor, a heat exchanger and a heat sink, the expansion engine provides a very effective cooling system that may be used for the cooling of small electronic devices like chips or modules.

BRIEF DESCRIPTION OF THE DRAWINGS

One way of carrying out the invention is described in detail below with reference to drawings which illustrate only specific embodiments, in which.

DETAILED DESCRIPTION OF THE INVENTION

Figure 1:
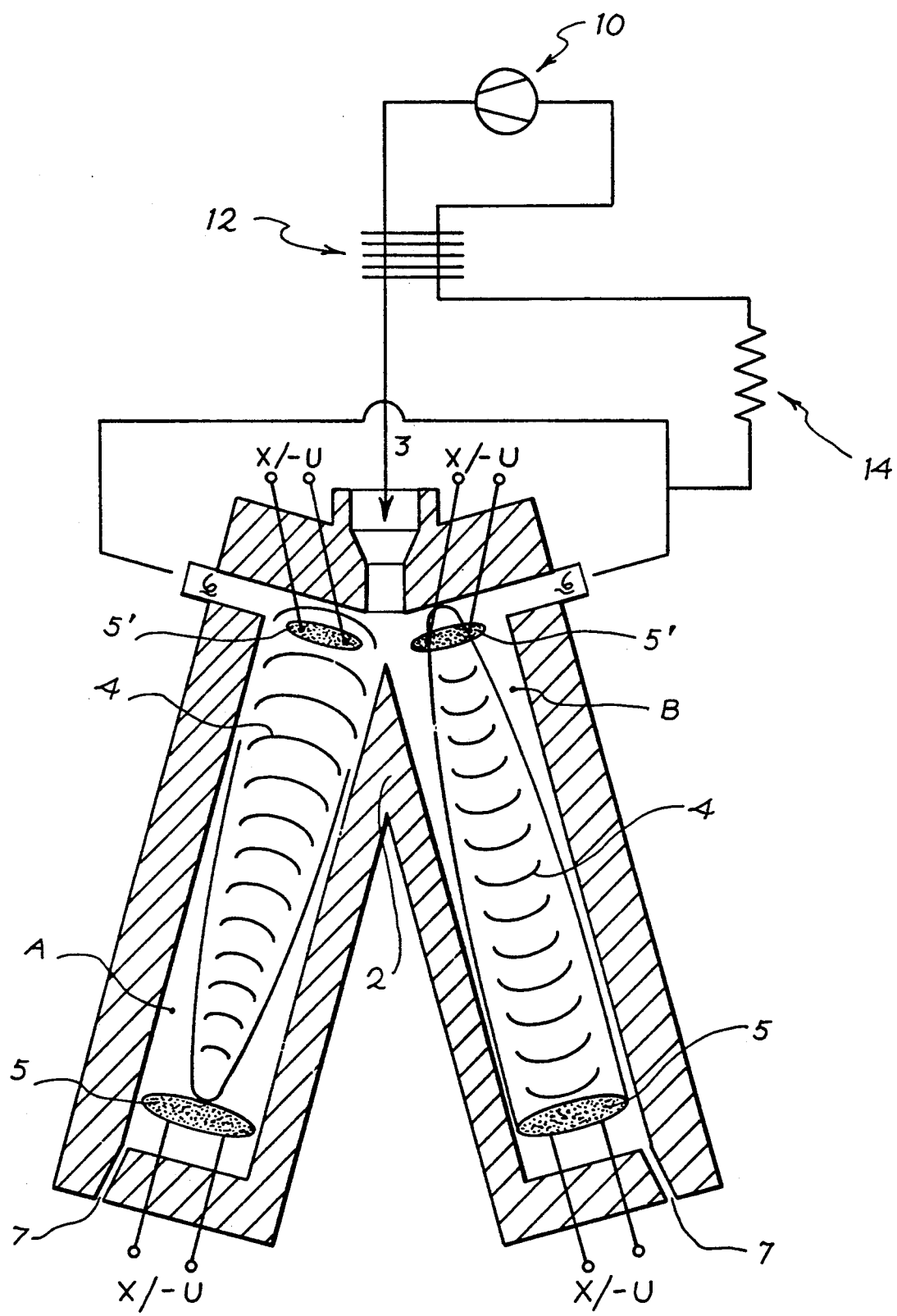
FIG. 1 is a cross-sectional view of the expansion engine.

The expansion engine shown in FIG. 1 consists of two resonator tubes A and B. These resonator tubes A,B are arranged symmetrically around a common inlet nozzle 1 in a way that an acute angle is formed between them.

A tip 2 lies opposite to the common inlet nozzle 1. Its shape allows compressed gas 3 entering the common inlet nozzle 1 to expand alternately into one of these two resonator tubes A,B.

The resonator tubes A,B are shaped to allow standing acoustic waves 4 to be excited inside the tubes. Preferably, the tubes have the shape of an organ-pipe or of a flute. Their inner walls are extremely smooth to minimize the absorption of acoustic energy by the walls.

Each resonator tube A,B has an acoustic/electric power converter 5 situated at the bottom end thereof. Converter 5 converts acoustic energy into electric energy. It is additionally preferred that the inner walls of tubes A,B be extremely smooth to maximize the amount of acoustic energy available for conversion into electrical energy. More acoustic energy may be absorbed, and thus the efficiency of the expansion engine may be increased, by providing a second pair of acoustic/electric power converters (5') situated at the top of each resonator tube.

Each tube A,B includes an exhaust port 6. The latter are arranged so that the central axes thereof extend perpendicular to the acoustic pressure so as to reduce the heat loss caused by dissipation of acoustic energy. By reducing such heat loss, more energy is available to be converted into electrical energy by the acoustic/electric power converters 5.

Exhaust ports 6 are preferably positioned at the same height as the common inlet nozzle 1.

Each resonator tube A,B includes a tiny orifice 7 or hot-gas outlet at the bottom thereof through which residual acoustic energy may be transmitted away from tubes A,B, thereby minimizing warming of the tube walls as a consequence of absorption of the residual acoustic energy.

Figure 2:
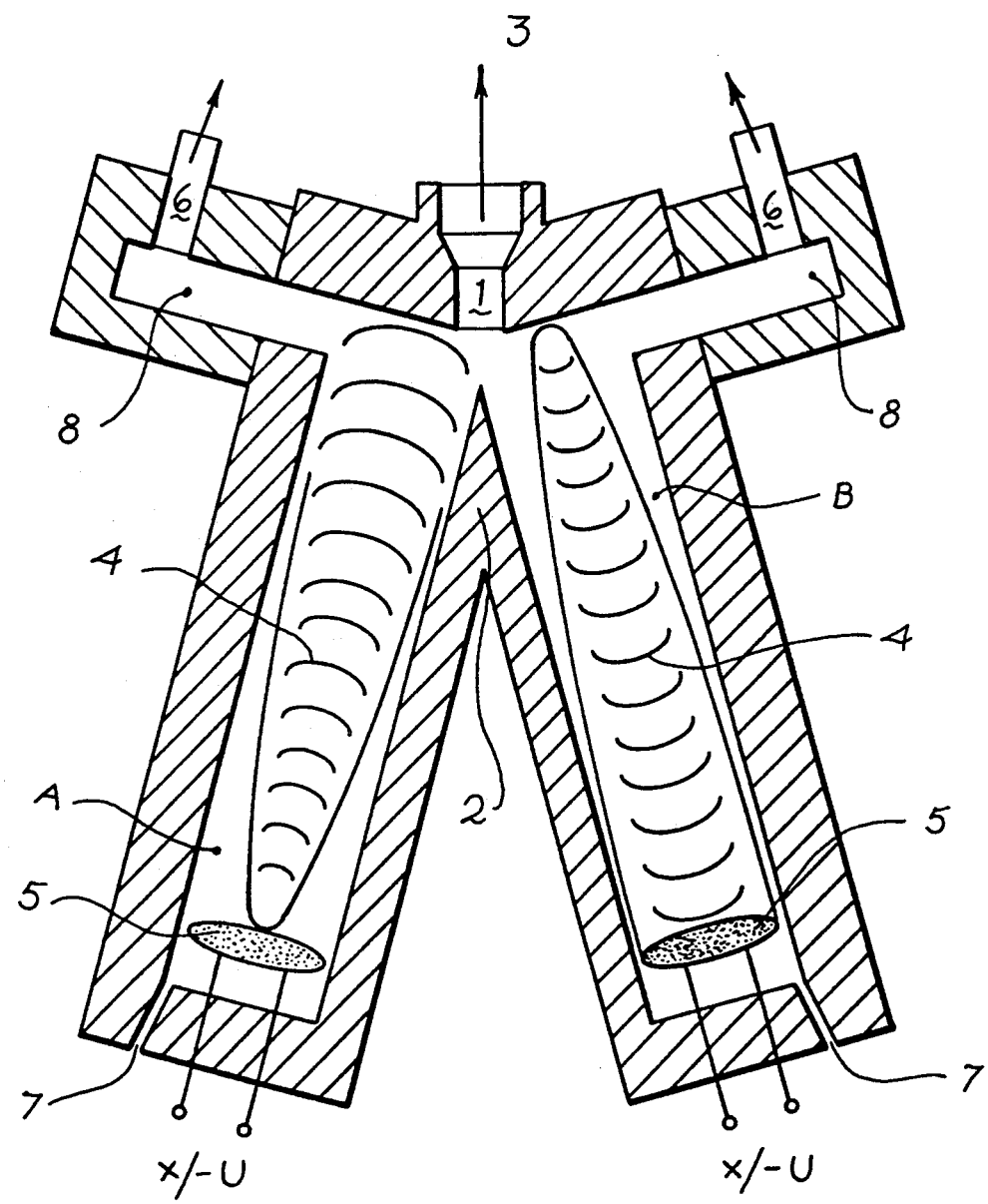
FIG. 2 is a cross-sectional view of another embodiment of the expansion engine.

A second embodiment of the invention is illustrated in FIG. 2. This expansion engine consists of additional resonator tubes 8, the central axes of which extend substantially perpendicular to the resonator tubes A,B. Tubes 8 are positioned at approximately the same height as the common inlet nozzle 1. Each resonator tube 8 is shaped so that it has the same eigenfrequency as the two resonator tubes A,B and the acoustic/electric power converters 5.

The expansion engine may be used in a known cooling system comprising a compressor 10, a heat exchanger 12 and a heat sink 14. A suitable material for the expansion engine and the whole cooling system comprises silicon and other materials. Such devices may be micro-machined using techniques described, inter alia, by K. Petersen in "Techniques and Applications of Silicon Integrated Micromechanics" in RJ3047 (37942) 2/4/81.

In the low temperature generation process, a compressed gas 3 enters the expansion engine at high pressure through inlet nozzle 1. As a consequence of the relative placement of inlet nozzle 1 and tip 2, compressed gas 3 alternately expands into one of the two resonator tubes A,B and thereby excites standing acoustic waves 4 in the tubes. The phase displacement of the waves in the different tubes is about half the acoustic wavelength.

The acoustic pressure reaches its maximum value at the bottom of the expansion engine where the acoustic/electric power converter 5 is located. The standing acoustic waves 4 intercept and are reflected from the acoustic/electric power converters 5, thereby causing the latter to start oscillating. As a consequence of such oscillation, acoustic energy is converted into electric energy. The standing acoustic waves in tubes A,B are attenuated as a result of their interaction with electric power converters 5. The resonator tubes and the power converters are shaped so that they both have the same eigenfrequency.

The acoustic/electric power converter 5 may be a piezo-electric transducer with a mechanical-electrical efficiency of about 0.8. Higher efficiencies may be achieved with electrical/magnetical coupling means of the type used in megaphones.

In summary, with the present invention, compressed gas expands in resonator tubes A,B, generating standing acoustic wave energy. This energy is converted into electrical energy by converters 5 and residual acoustic energy is dissipated.

In "Kryotechnik", W.G.Fastowski et al., chapter 3.9, page 177, a gas cooling system with two expansion turbines is described. Replacing these expansion turbines by the two resonator tubes of the invention and assuming that all components have the same efficiency provides the following efficiency data:

| starting temperature | 293 K |
| --- | --- |
| low temperature | 10 K |
| compression pressure | 20 kp/cm2 |
| real efficiency | 0.01 Carnot |
| efficiency | 0.035 |
| efficiency figure | 0.28 |

Such analysis shows that very low temperatures (10K) may be reached at relatively low pressure (20 kp/cm$^2$) using an adiabatic-isothermic expansion process. Cooling systems with an expansion engine as described and claimed are, therefore, very useful for cooling miniature structures.

Since certain changes may be made in the devices and processes described above without departing from the scope of the present invention, it is intended that all matter contained in the foregoing description or shown in the accompanying drawings shall be interpreted in an illustrative and not in a limiting sense.

What is claimed is:

1. A method of generating electrical power, the method comprising the following steps:
   a. releasing compressed gas at high pressure from an inlet nozzle;
   b. alternately directing said compressed gas into one of two resonator tubes that are designed to permit standing acoustic waves to be created therein;
   c. expanding said compressed gas in said resonator tubes as an adiabatic-isothermic process so as to create said standing acoustic waves; and
   d. converting acoustic energy associated with said standing waves into electrical energy.

2. A method according to claim 1, wherein said step d involves providing at least one piezo-electric transducer in each of said resonator tubes for converting said acoustic energy into said electrical energy, said piezo-electric transducers being designed to oscillate at the same frequency as said standing waves.

3. A method according to claim 1, further comprising the step of dissipating heat from a heat sink of a cooling system coupled with said tubes using cold created as a result of said adiabatic-isothermal expansion of said compressed gas in said tubes.

4. A method according to claim 1, wherein said tubes are designed so that said standing waves in each of said tubes have about the same wavelength, further wherein said step b is effected so that said standing waves in one of said tubes have a phase displacement relative to said standing waves in said other tube of about half of the wavelength of said standing waves.

5. An expansion engine comprising:
   a first resonator tube having an interior for supporting standing acoustic waves, said first resonator tube having first and second ends;
   a second resonator tube having an interior for supporting standing acoustic waves, said second resonator tube having first and second ends;
   a common inlet nozzle for releasing pressurized gas into said interiors of said first and second resonator tubes;
   a diverter for alternately directing said pressurized gas released by said nozzle into said interior of one of said first and second resonator tubes;
   first and second power converters positioned, respectively, in said interiors of said first and second resonator tubes for converting acoustic energy associated with said standing waves into electrical energy; and
   first and second exhaust ports coupled, respectively, with said first and second tubes for releasing gas from said interiors of said first and second tubes.

6. An expansion engine according to claim 5, wherein said first and second resonator tubes each have an elongate axis, further wherein said tubes are relatively positioned so that said an acute angle is formed between said elongate axes.

7. An expansion engine according to claim 5, wherein said interior of said first tube is coupled with said interior of said second tube adjacent said first ends of said first and second tubes, further wherein said diverter comprises a tip positioned opposite said common inlet nozzle, said tip being sized and configured to alternately direct said compressed gas released by said common inlet nozzle into said interiors of said first and second resonator tubes.

8. An expansion engine according to claim 5, further comprising at least one additional resonator tube coupled with at least one of said first and second resonator tubes, said at least one additional resonator tube having an elongate axis extending substantially perpendicular to the elongate axis of the one of said first and second tubes with which it is coupled, said additional resonator tubes being coupled with said first and second resonator tubes adjacent said common inlet nozzle.

9. An expansion engine according to claims 5, wherein said first and second resonator tubes and said power converters have the same eigenfrequency.

10. An expansion engine according to claim 8, wherein said first and second resonator tubes, said additional resonator tubes, and said power converters have the same eigenfrequency.

11. An expansion engine according to claims 5, wherein said power converters are positioned adjacent said second ends of said first and second resonator tubes.

12. An expansion engine according to claims 5, further comprising a second power converter positioned in said interiors of said first and second resonator tubes adjacent said first ends of said tubes.

13. An expansion engine according to claim 5, wherein said first and second power converters each comprise piezo-electric transducers.

14. An expansion engine according to claim 5, wherein said first and second exhaust ports each have a central axis and are positioned (a) so that said central axes extend substantially perpendicular to the acoustic pressure of said standing acoustic waves and (b) adjacent said common inlet nozzle.

15. An expansion engine according to claim 5, wherein said expansion engine is made from a material comprising silicon.

16. An expansion engine according to claim 5, further comprising a cooling system coupled with said first and second resonator tubes for extracting cold from said tubes generated upon expansion of said compressed gas in said tubes.

17. An expansion engine according to claim 16, wherein said cooling system comprises:
 a compressor;
 a heat exchanger; and
 a heat sink.

18. An expansion engine according to claim 16, wherein said cooling system is made from a material comprising silicon.

* * * * *